United States Patent [19]
Nam

[11] Patent Number: 5,973,625
[45] Date of Patent: Oct. 26, 1999

[54] CODING METHOD AND CODER OF A D-VHS CODEC SYSTEM USING FORWARD REED SOLOMON ERROR CORRECTION

[75] Inventor: Seung-Hyun Nam, Anyang, Rep. of Korea

[73] Assignee: Daewoo Electronics Co., Ltd., Seoul, Rep. of Korea

[21] Appl. No.: 08/998,485

[22] Filed: Dec. 29, 1997

[30] Foreign Application Priority Data

Dec. 31, 1996 [KR] Rep. of Korea ................ 96 80868

[51] Int. Cl.[6] .................. H03M 7/00; H04N 7/52; H04H 1/00
[52] U.S. Cl. .............. 341/50; 386/94; 386/111; 386/124; 455/3.2; 714/755
[58] Field of Search .................. 360/51, 32, 60; 341/50, 100; 714/755; 386/33, 40, 94, 111, 112, 124; 348/845.1, 845.2, 845.3, 10; 455/3.2, 6.2

[56] References Cited

U.S. PATENT DOCUMENTS 5,644,310  7/1997  Laczko et al. .................. 341/143
5,878,187  3/1999  Kubota et al. .................. 386/95

FOREIGN PATENT DOCUMENTS 2 277 660  11/1994  United Kingdom .

OTHER PUBLICATIONS

"JVC Unveils HM–DSR100 D–VHS Digital Satellite Recorder", Victor Company of Japan, Ltd., 1996 4 pages.
"JVC Finalizes Technical Specifications of D–VHS Standard (STD) Mode", Victor Company of Japan, Ltd., 1996, 2 pages.
"Basic Technical Specifications of D–VHS Standard (STD) Mode", Victor Company of Japan, Ltd., 1996, 1 pages.
"What is Bit Stream Recording?", Victor company of Japan, Ltd., 1996, 1 page.
"What is IEEE 1394 Digital Interface?", Victor Company of Japan, Ltd., 1996, 1 page.
"Features of Digital Broadcasts", Victor Company of Japan, Ltd., 1996, 1 page.
"D–VHS Applications", Victor Company of Japan, Ltd., 1996, 1 page.
"The Evolution of VHS", Victor Company of Japan, Ltd., 1996, 1 page.

*Primary Examiner*—Michael Tokar
*Assistant Examiner*—Patrick Wamsley
*Attorney, Agent, or Firm*—Pillsbury Madison & Sutro LLP

[57] ABSTRACT

A coding method and a coder of a D-VHS codec system for recording/reproducing a high-definition picture and a high-fidelity sound is disclosed. In the recording of digital data which is compressed or processed, the coding method and the coder of the D-VHS codec system record digital data with forward error correction addition information in the format of a track for a forward error correction. Consequently, an enormous quantity of computation which cannot be processed by programs, is performed in real time by an optimal data flow operation process method and the compressed or processed digital data is processed at a high speed. Also, a hardware configuration of the codec which conventionally includes two or three pieces of circuit board implements one custom-made semiconductor chip and cuts a unit cost of the manufacturing of the D-VHS codec.

19 Claims, 14 Drawing Sheets

CODING METHOD AND CODER OF A D-VHS CODEC SYSTEM USING FORWARD REED SOLOMON ERROR CORRECTION

BACKGROUND OF THE INVENTION

1. Field of the Invention

The present invention relates to a coding method and a coder of a digital-video home system codec system for recording/reproducing a high-definition picture and a high-fidelity sound.

2. Description of the Prior Art

Since digital television broadcasts have begun to be on the air using MPEG2 (Moving Picture Experts Group 2) in 1994, many broadcasting companies all over the world are putting the digital broadcasts into operation or plan to put it into operation before long. The reason broadcasting companies participate in the digital broadcasts is that digital data has a trifling loss of information and provides both a high-quality moving picture and a high-fidelity sound, and that digital information has a compatibility which is well-suited for the multimedia age. At this time, many overseas electronics manufacturers anticipate the marketability of a digital data recorder (hereinafter, referred to as "DR") while they intensively invest their money in the development of DR's.

Victor Company of Japan, Ltd. (JVC) has finalized the technical specifications of a Digital-Video Home System (hereinafter, referred to as "D-VHS") Standard (STD) mode. Standardization of the specifications was achieved after consultation with Hitachi, Ltd., Matsushida Electric Industrial Co., Ltd. and Philips Electronics N.V. regarding D-VHS, which was announced in April of 1995. This paves the way for D-VHS technology to be incorporated in products, further advancing VHS as a recording medium in the upcoming multimedia age.

D-VHS is a new technology which is based on VHS, the world's most popular home video format. In addition to offering the features of the conventional VHS, to address the needs of multimedia applications, this new VHS technology offerers bit stream recording capability which will allow recording of compressed digital data such as digital broadcasts. By making the most of the advantages of tape media—namely high capacity and low cost—expectations are that D-VHS can be used in new applications, including in an in-home digital data storage device.

The digital broadcast has the video/audio characteristics of multichannel, high picture quality, surround sound, multilingual and so on. Also, in the aspect of information, the digital broadcasts are divided into service information such as program lists and commentaries, and data broadcasts such as PC softwares, shopping catalogs and electronic publishing. Technology which offers both recording and reproducing of a large quantity of diversified information is essential in the rapidly-progressing multimedia age. FIG. 1 is a block diagram for showing a schematic circuit configuration of a system for recording/reproducing digital broadcast data by a conventional D-VHS. As shown in FIG. 1, an audio/video signal which is supplied from a camera 11 is converted into a digital signal by an analog-to-digital converter 12 in a broadcasting station. The audio/video signal which is converted into a digital signal passes through a digital compressor 13 and is processed by a digital picture compression process such as the MPEG2. The compressed signal is QPSK (Quadrature Phase Shift Keying)-modulated by a modulator 14 and is propagated via a broadcast satellite 15. The digital broadcast data which is received by a broadcast receiving antenna 16, sequentially passes through a tuner 171 and a demodulator (not shown) and becomes a demultiplexed digital data. The demultiplexed digital data passes through an IEEE1394 digital interface and is provided to an input port of a D-VHS system 18 in the form of bit stream. The bit stream is recorded, in the format of a track, on a tape which is loaded on a deck (not shown) of D-VHS system 18.

In playback, the digital data which is read out from the tape passes through the IEEE1394 digital interface and is processed by a digital expander 172. The digital data from digital expander 172 passes through a digital-to-analog converter 173 and is provided to a television receiver 19.

Namely, bit stream recording is a method of recording compressed or processed, e.g., encrypted, signals such as those of digital broadcasts on a tape directly as digital data, and outputting them in the same state as they were input.

Therefore, a bit stream recording unit does not incorporate functions like analog-to-digital conversion, digital-to-analog conversion, digital compression/decompression or descrambling. Thus, video and audio signals cannot be reproduced using that unit alone. To reproduce the video and audio signals, the bit stream data must pass through a digital broadcast receiver's circuits that convert the digital data to video and audio signals.

Also, the D-VHS has the following characteristics. Firstly, in addition to analog recording of current broadcasting systems such as NTSC or PAL, timeshifting of digital broadcasts by bit stream recording is possible. Secondly, by offering the high-capacity characteristics of tape media, data recording in step with the multimedia age is possible. Thirdly, by maintaining compatibility with the current VHS format, playback of the vast VHS software library existing worldwide is possible. Fourthly, by utilizing most of the conventional VHS technology, parts and production facilities, widespread penetration and development for home use is possible.

The D-VHS has the recording capability of storing digital data for up to 7 hours at the input data rate of 14.1 [Mbps]. In a long play mode, the D-VHS has the recording capability of storing digital data for up to about 14 hours at the input data rate of 7 [Mbps]. Namely, the D-VHS has the recording capability of 44 [gigabytes]. The D-VHS is applicable to video servers, security recorders, data loggers, data storages and so on.

In step with the rapidly-progressing multimedia age, it is required to develop a coding method and a coder of a D-VHS codec system which performs an enormous quantity of computation in real time and has a low unit cost of manufacturing in order to store compressed information such as digital broadcast data in high capacity and to reproduce a high-definition picture and a high-fidelity sound.

SUMMARY OF THE INVENTION

Therefore, it is a first object of the present invention to provide a coding method of a D-VHS codec system which, in the recording of digital data which is compressed or processed, records the digital data with forward error correction addition information in the format of a track for a forward error correction (hereinafter, referred to as "FEC").

It is a second object of the present invention to provide a coder of the D-VHS codec system which, in the recording of digital data which is compressed or processed, records the digital data with the FEC addition information in the format of the track for the forward error correction.

In order to achieve the first object, the present invention provides a coding method of a D-VHS codec system, which comprises the steps of:

(i) annexing a time stamp to a packet header of each stream packet element when digital broadcast data propagated from a broadcasting station via a satellite is inputted in a form of transport stream packet elements via a set-top box, and generating transport packet data having the time stamp annexed thereto;

(ii) storing onto a smoothing buffer the transport packet data having the time stamp annexed thereto in step (i);

(iii) inserting stuffings among the transport packet data on the basis of the time stamp of the transport packet data stored on the smoothing buffer in step (ii) to convert into data having a predetermined data rate, and reading out data-rate-converted transport packet data;

(iv) separating each of the transport packet data being read from the smoothing buffer and including the normal data into two sync blocks, and generating packetized data by annexing a first additional information to the header of each of the sync blocks;

(v) recording the packetized data generated in step (iv) in a relevant track of a memory in accordance with a recording control signal in synchronization with a system clock on the basis of an address of the memory computed by the value of an ID included in the first additional information generated in step (iv);

(vi) judging whether or not the packetized data generated in step (iv) is sequentially recorded in step (v) up to a predetermined number of tracks;

(vii) shuffling the sync blocks with respect to the packetized data newly recorded in step (v) when it is judged in step (vi) that the packetized data is completely recorded in the relevant track, and executing both an inner RS coding and an outer RS coding in order to generate a parity;

(viii) judging whether or not a recording stop signal is in an enable state;

(ix) inputting, in an order of the track, frame data whose coding is completed in step (vii) when it is judged in step (viii) that the recording stop signal is not in the enable state, and configuring the frame data in a format of the track;

(x) scrambling in M-sequence both main code sync blocks and subcode sync blocks of the frame data configured in the format of the track in step (ix) when establishing the relevant IDs as initial values thereof, and generating scrambled data;

(xi) preceding all data of the sync blocks except ambles and margins included in the scrambled data generated in step (x) and generating precoded data;

(xii) recording precoded data generated in step (xi) on a tape loaded in a deck;

(xiii) returning to step (viii) after performing step (xii); and (xiv) stopping a recording operation when it is judged in step (viii) that the recording stop signal is in the enable state.

In order to achieve the second object, the present invention provides a coder of a D-VHS codec system, which comprises:

a time stamp generator for generating a time stamp representing an arrival time of a first byte of each stream packet element of digital broadcast data when the digital broadcast data is inputted in a train of bits in a form of transport stream packet elements via a set-top box, and for providing transport packet data by annexing the relevant time stamp to a packet header of each of the transport stream packet elements;

a smoothing buffer for sequentially storing the transport packet data from the time stamp generator while changing a variable time interval among a series of transport stream packet elements into a constant time interval of the transport packet data, and for providing smoothened transport packet data;

a packetizer for separating each of the smoothened transport packet data, including the normal data, from the smoothing buffer, into two sync blocks, and for providing packetized data by annexing a first additional information to the header of each of the sync blocks;

a memory for sequentially recording the packetized data in a relevant track thereof in accordance with a recording control signal in synchronization with a system clock on the basis of an address thereof computed by the value of an ID included in the first additional information of the packetized data from the packetizer;

a data controller for allocating a time for each device to access the memory during the recording of data or when receiving a request for reading out data, and for arbitrating data requirements colliding with each other;

a memory controller for providing both a recording/readout address of a memory location and a recording/readout control signal in order to record or read out the data onto/from the memory under the control of the data controller;

a shuffler for shuffling the sync blocks equivalent to the packetized data recorded in the tracks of the memory, and for generating error correcting code blocks;

an RS coder for respectively executing an inner RS coding and an outer RS coding in a horizontal direction and in a vertical direction with respect to each of the error correcting code blocks from the shuffler, and for generating a parity;

a track formatter for configuring read sync blocks in the format of the track while reading out frame data recorded on the memory via the data controller in an order of the track and in an order of the sync block of each of the tracks after the coding is completed by the RS coder, and for providing track-formatted data;

a scrambler for scrambling by M-sequence data both main code sync blocks and subcode sync blocks of the track-formatted data from the track formatter when establishing the relevant IDs as initial values thereof, and for providing scrambled data;

a precoder for preceding all data of the sync blocks except ambles and margins included in the scrambled data from the scrambler, and for providing precoded data to a tape loaded in a deck; and a microcontroller for providing subcode data and system data to the data controller.

In a coding method and a coder of a D-VHS codec system according to the present invention, an enormous quantity of computation which cannot be processed by programs, is performed in real time by an optimal data flow operation process method, and the compressed or processed digital data is processed at a high speed.

BRIEF DESCRIPTION OF THE DRAWINGS

The above objects and other advantages of the present invention will become more apparent by describing in detail a preferred embodiment thereof with reference to the attached drawings, in which.

DESCRIPTION OF THE PREFERRED EMBODIMENT

A description will be given below in detail with reference to accompanying drawings to a configuration and an operation of a coding method and a coder of a D-VHS codec system according to an embodiment of the present invention.

Figure 1:
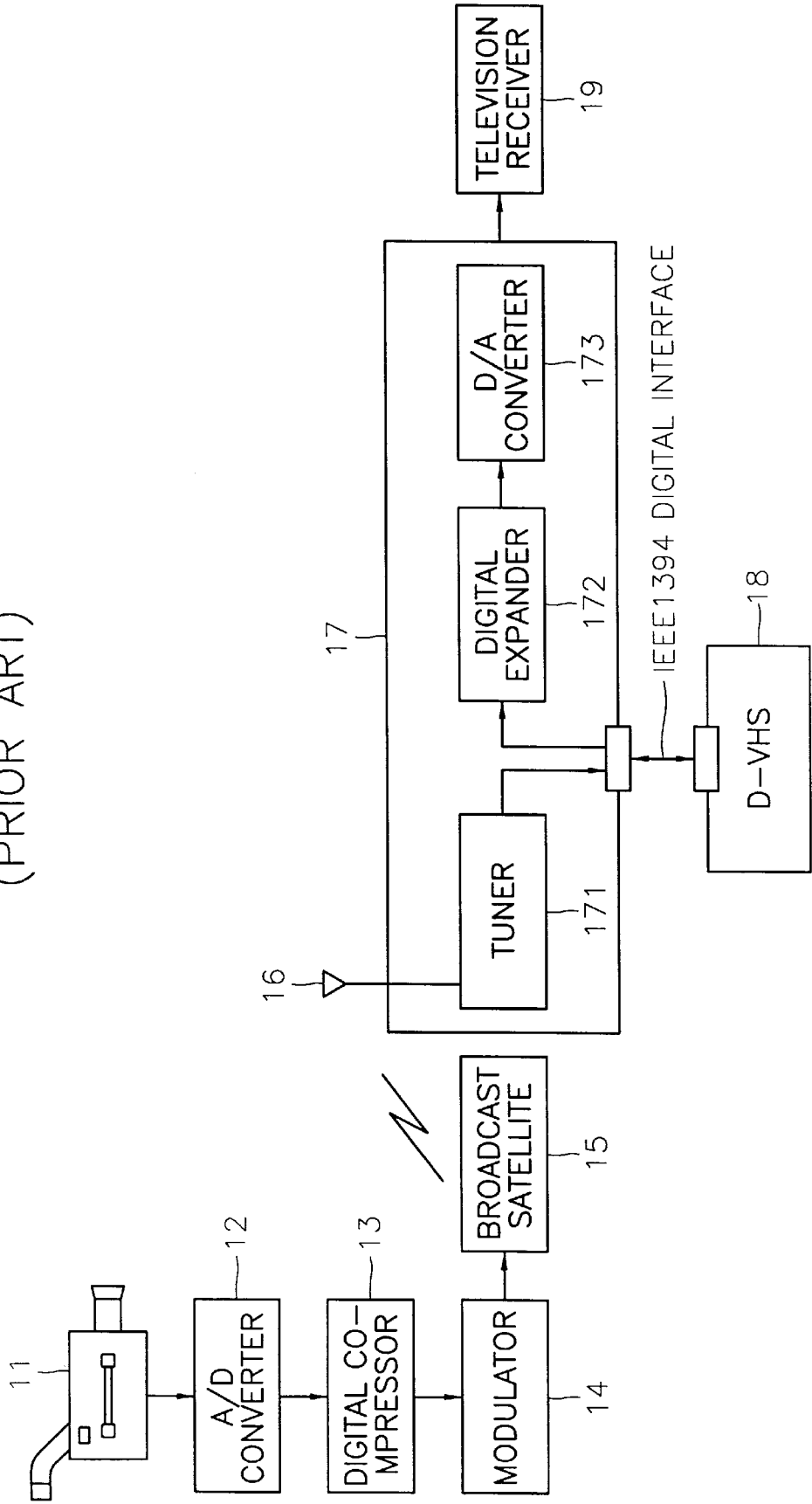
FIG. 1 is a block diagram for showing a schematic circuit configuration of a system for recording/reproducing digital broadcast data with a conventional D-VHS.
Figure 2:
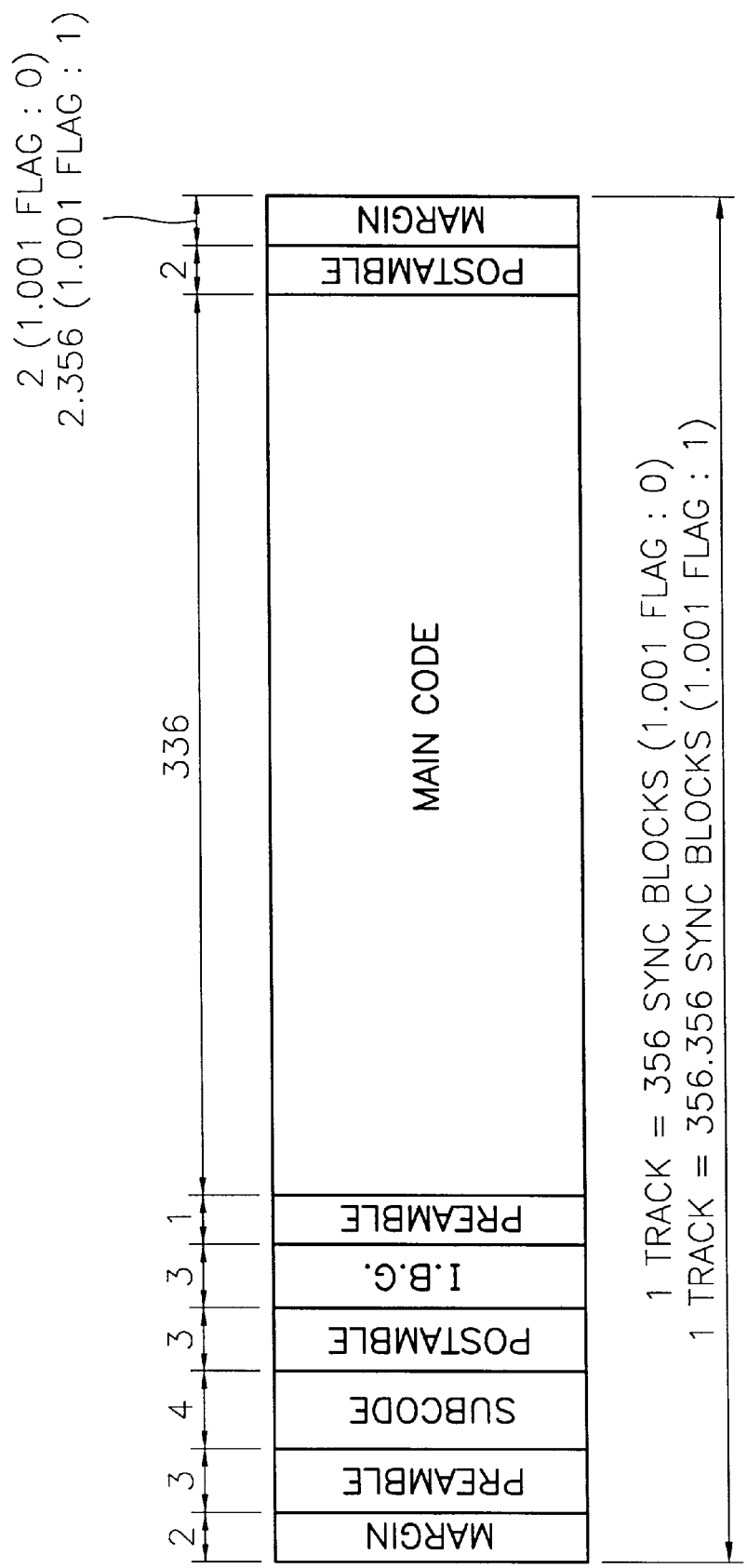
FIG. 2 is a view for showing a structure of one track which is applied to a recording data structure in a basic format of a D-VHS system standard.

FIG. 2 is a view for showing a structure of one track which is applied to a recording data structure in a basic format of a D-VHS system standard. As shown in FIG. 2, a track consists of 356 sync blocks. However, when 1.001 flag in Format ID is set to 1, a track consists of 356.356 sync blocks. Each of sync blocks is composed of 896 bits. A main code area consists of main data sync blocks. A subcode area consists of subcode sync blocks. One sync block consists of 4 subcode sync blocks.

Figure 3:
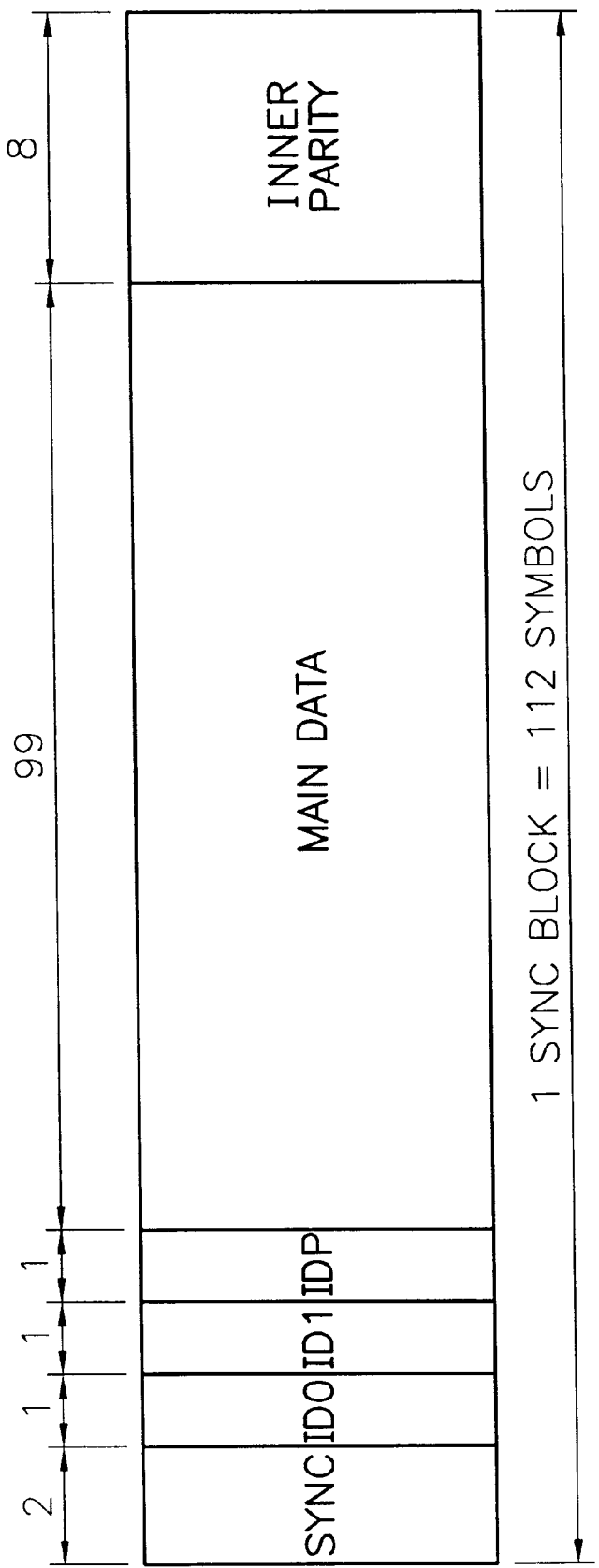
FIG. 3 is a view for illustrating a structure of one main data sync block which is included in a main code of one track shown in FIG. 2.

FIG. 3 is a view for illustrating a structure of one main data sync block which is included in a main code of one track shown in FIG. 2. As shown in FIG. 3, the main data sync block consists of a sync, an ID, a main data and an inner parity. One main data sync block has 99 symbols of Main data and 8 symbols of Inner parity. One symbol is composed of 8 [bits].

The Sync stands for a boundary which divides sync blocks. The ID consists of ID0, ID1 and IDP. The ID0 and ID1 respectively stands for a number of a track to which a sync block belongs and a position of the sync block in a relevant track. The IDP is an error detection code for the ID0 and the ID1.

Figure 4:
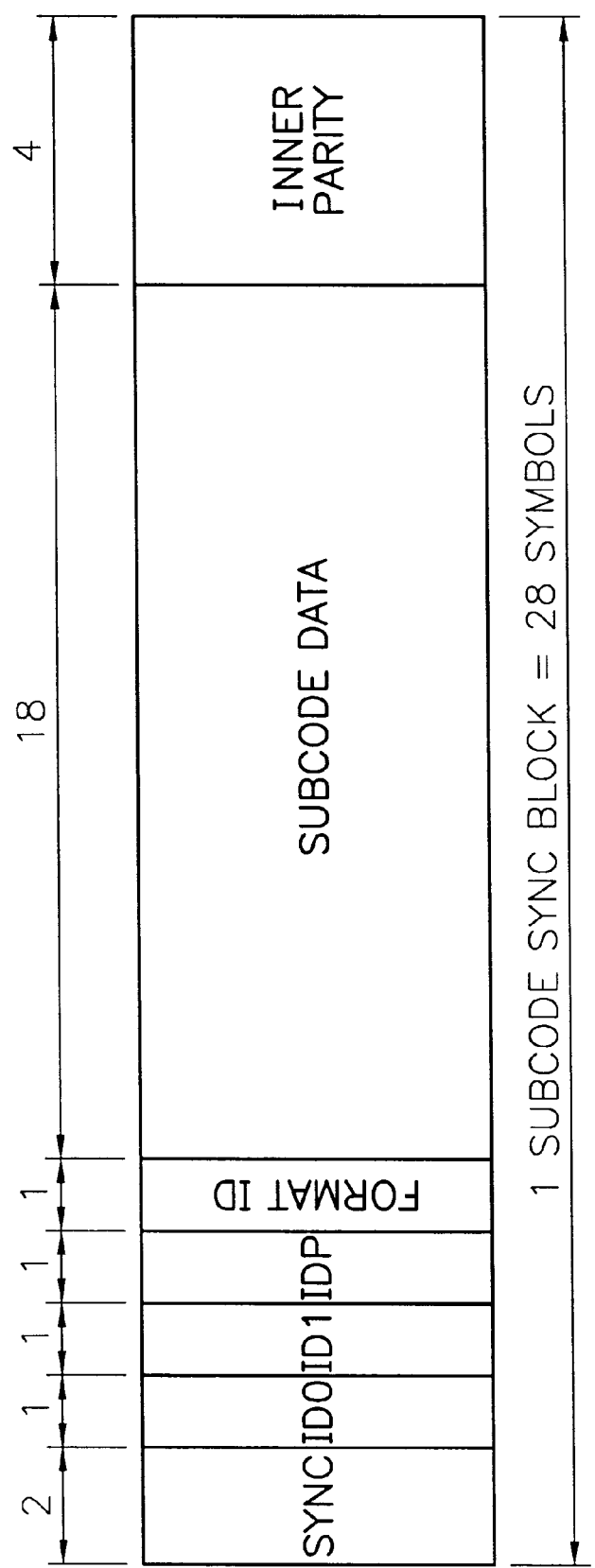
FIG. 4 is a view for illustrating a structure of one subcode sync block which is included in a subcode of one track shown in FIG. 2.

FIG. 4 is a view for illustrating a structure of one subcode sync block which is included in a subcode of one track shown in FIG. 2. As shown in FIG. 4, the subcode sync block consists of a sync, an ID, a format ID, a subcode data and an inner parity. One subcode sync block has 18 symbols of Subcode data and 4 symbols of Inner parity. One symbol is composed of 8 bits.

Figure 5:
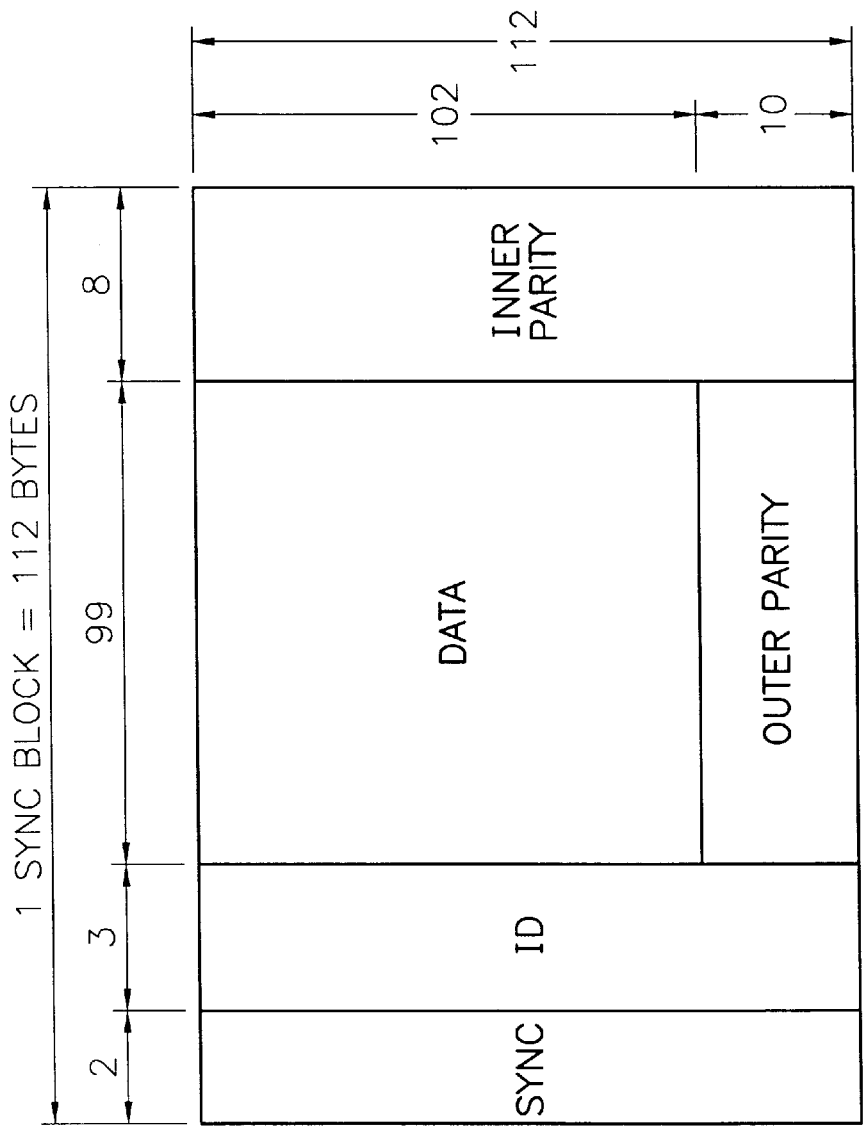
FIG. 5 is a view for showing a structure of one error correcting code (ECC) block in a D-VHS system standard.

FIG. 5 is a view for showing a structure of one error correcting code (hereinafter, referred to as "ECC") block in a D-VHS system standard. As shown in FIG. 5, one ECC block consists of 102 data sync blocks and 10 outer parity sync blocks. Main code area has 336 main data sync blocks. They consist of 306 data sync blocks and 30 outer parity sync blocks. The combined main code areas of 6 tracks consists of 18 ECC blocks.

Figure 6:
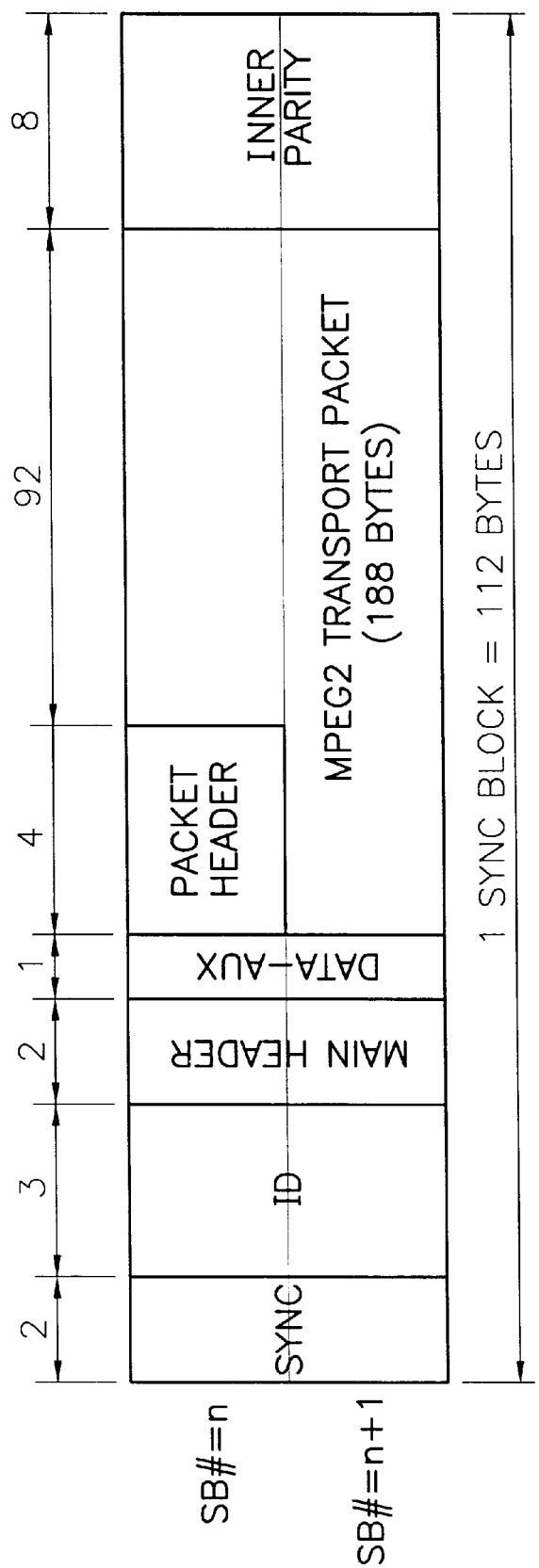
FIG. 6 is a view for showing an MPEC2 transport stream recording structure in an MPEG2 STD mode format of a D-VHS system standard.

FIG. 6 is a view for showing an MPEG2 transport stream recording structure in an MPEG2 STD mode format of a D-VHS system standard. As shown in FIG. 6, when application detail in main header is set to 000, MPEG2 transport stream is recorded. MPEG2 transport packet (188 bytes) and associated packet header information (4 bytes) are recorded onto two sync blocks.

Figure 7:
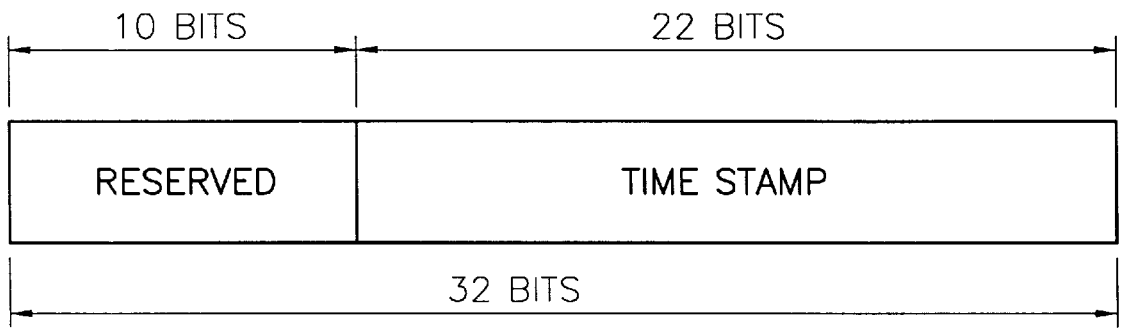
FIG. 7 is a view for showing a structure of a packet header which is included in the MPEG2 transport stream recording structure shown in FIG. 6.

FIG. 7 is a view for showing a structure of a packet header which is included in the MPEG2 transport stream recording structure shown in FIG. 6. As shown in FIG. 7, the lower 22 bits of the packer header are used for a time stamp which indicates the input time of the transport packet. Reserved bits shall be set to 0.

Figure 8:
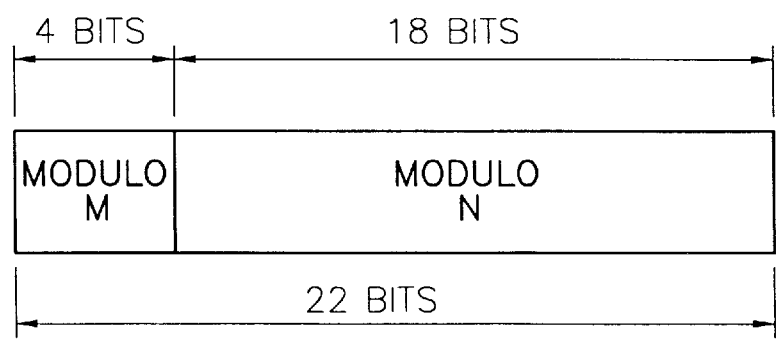
FIG. 8 is a view for showing a structure of a time stamp which is included in the packet header shown in FIG. 7.

FIG. 8 is a view for showing a structure of a time stamp which is included in the packet header shown in FIG. 7. As shown in FIG. 8, the time stamp is the input time of the transport packet and it is recorded as the sampled value of the local time stamp generator in order to put the exact same time interval of playback as that of the input. The clock frequency of the local time stamp generator is 27 [MHz] (±27 [rpm]) and while recording, it shall be phase-locked in the input PCR data. The default value of time stamp generated by the local time stamp generator is 0. The drum rotation phase should be synchronized with the value of the local time stamp generator during recording and playback. The upper 4 bits of the Time stamp indicate the value counted up every quarter rotation of a drum, and it repeats from 0 to 11 (mod 12). The lower 18 bits of the time stamp indicate the value counted up by the local time stamp generator (27 [MHz]), and it repeats from 0 to 224999 (mod 225000; 1800 [rpm]) or from 0 to 225224 (mod 225225; 1800/1.001 [rpm]).

Figure 9:
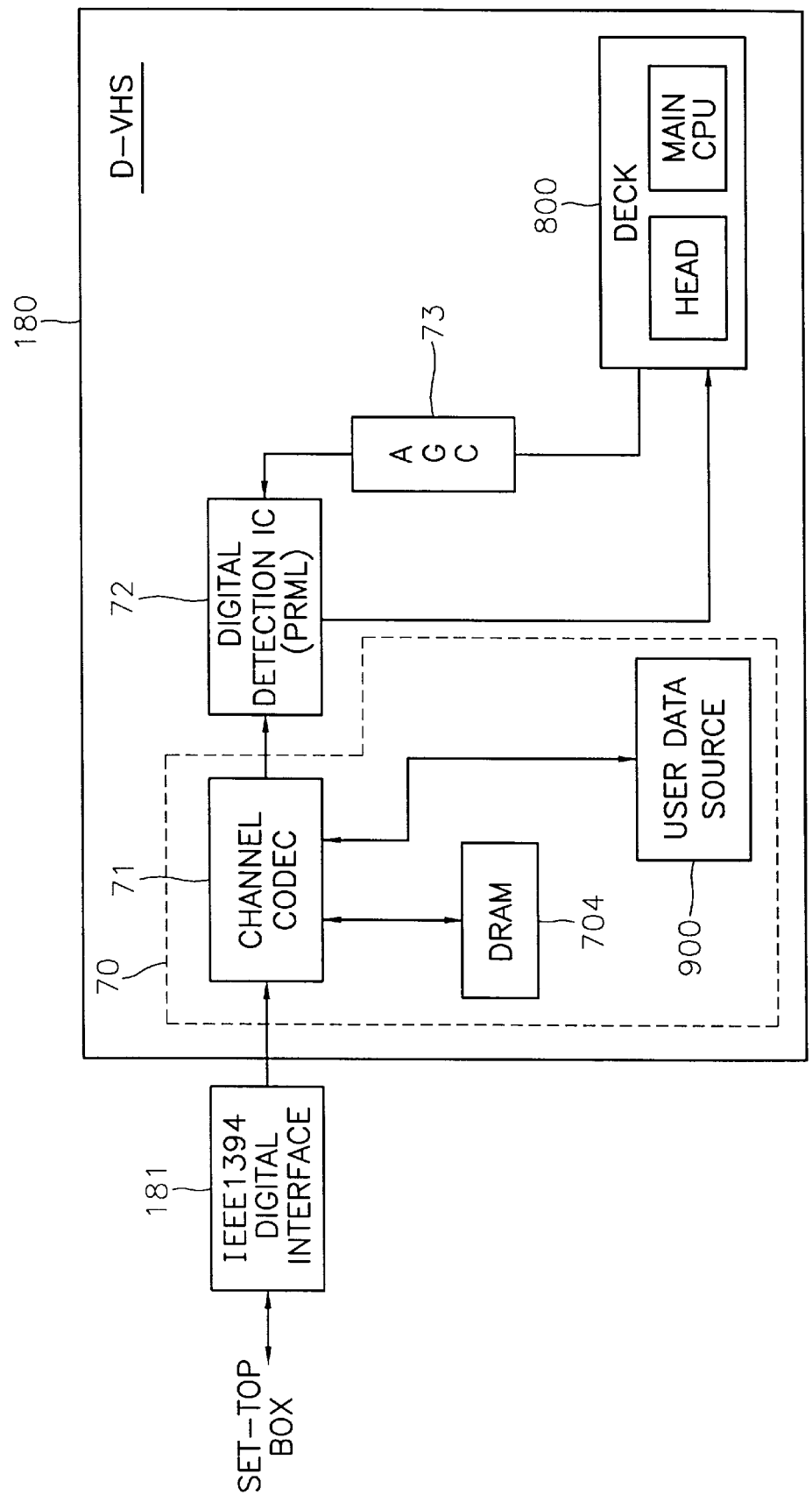
FIG. 9 is a block diagram for showing a circuit configuration of a D-VHS system according to an embodiment of the present invention.

FIG. 9 is a block diagram for showing a circuit configuration of a D-VHS system according to an embodiment of the present invention. As shown in FIG. 9, a D-VHS system 180 includes a deck 800, a recording/playback detector (i.e., partial response maximum likelihood; PRML) 72 which is implemented by a decision feedback equalizer (DEF), a channel codec 71 and a microcontroller, i.e., a user data source, 900. Reference numerals 70 and 73 denote a D-VHS codec and an automatic gain controller, respectively. The bit stream of digital data passes through IEEE1394 digital interface 181 and is provided to D-VHS system 180. When the bit stream passes through channel codec 71, additional information for the error correction is generated and the bit stream is recorded onto a tape, which is loaded in deck 800, with the additional information for the error correction through a recording coding process.

In playback, because bit data which is detected from the tape by recording/playback detector 72, is damaged due to the bit damage caused by an external environment, by the bit error which results from the resolution of recording/playback detector 72 and so on, the errors of the bit data are corrected. The error-corrected data passes through IEEE1394 digital interface 181 and is provided to a set-top box.

Figure 10:
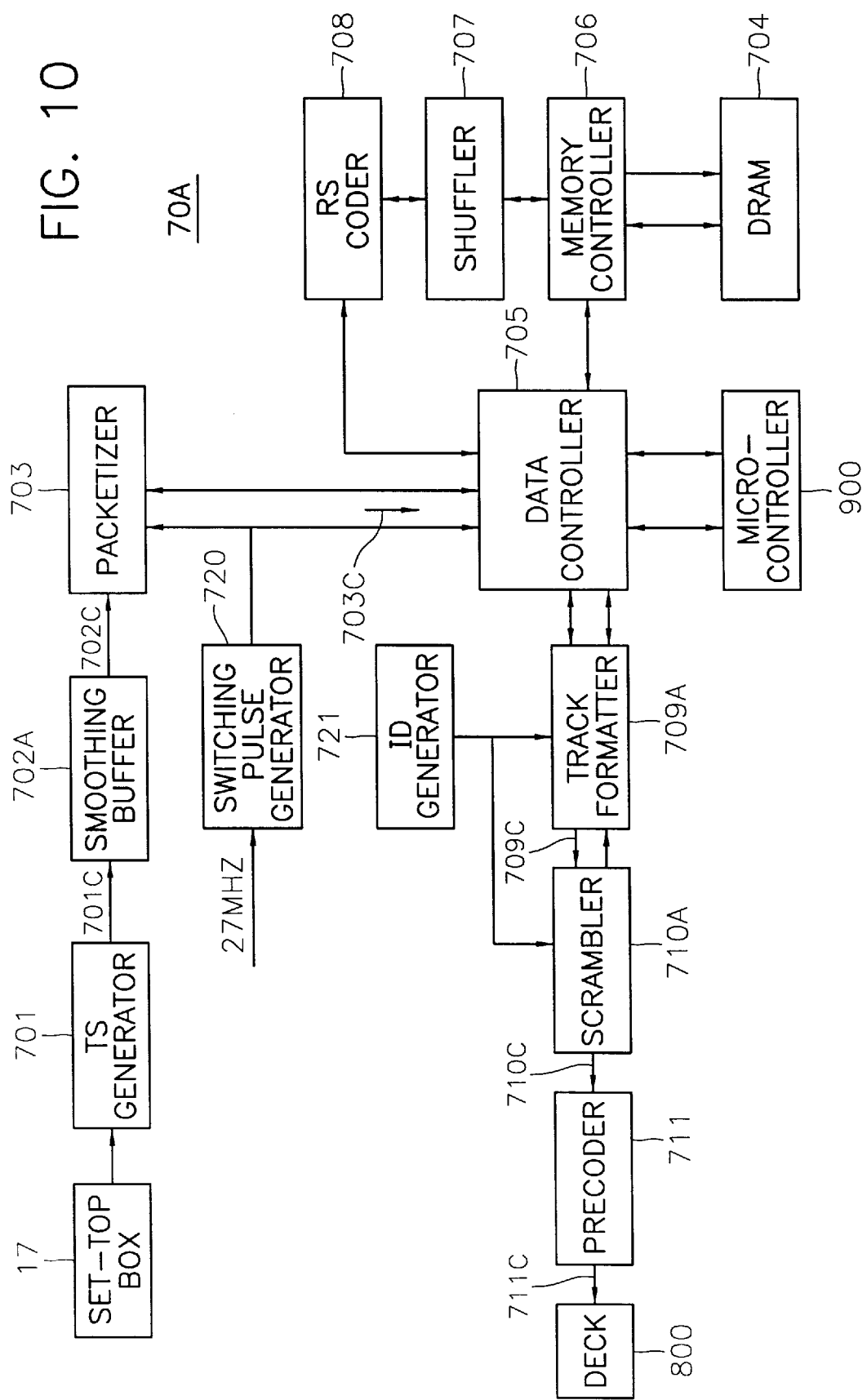
FIG. 10 is a block diagram for showing a circuit configuration of a coder of a D-VHS codec system according to an embodiment of the present invention.

FIG. 10 is a block diagram for showing a circuit configuration of a coder of a D-VHS codec system according to an embodiment of the present invention. As shown in FIG. 10, a coder 70A comprises a time stamp generator 701, a smoothing buffer 702A, a packetizer 703, a memory 704, a data controller 705, a memory controller 706, a shuffler 707, an RS coder 708, a track formatter 709A, a scrambler 710A, a precoder 711 and a microcontroller 900.

When the digital broadcast data is inputted in a train of bits in the form of the transport stream packet element via a set-top box 17, time stamp generator 701 generates a time stamp representing an arrival time of a first byte of each of transport stream packet elements of digital broadcast data and provides transport packet data 701C by annexing the relevant time stamp to a packet header of each of the transport stream packet elements. Time stamp generator 701 generates 4 bytes of the time stamp for the transport stream packet element which consists of 188 bytes in response to a clock signal of 27 [MHz] which is synchronized with a program clock reference included in a bit stream of the digital broadcast data, and generates 192 bytes of transport packet data 701C by annexing the relevant time stamp to the packet header of the transport stream packet element.

Smoothing buffer 702A sequentially stores transport packet data 701C from time stamp generator 701 while changing a variable time interval among a series of transport stream packet elements into a constant time interval with respect to transport packet data 701C, and provides smoothened transport packet data 702C. Smoothing buffer 702A has a first-in-first-out structure with a capacity of 640 [Kbit], and the transport packet data 701C is read out in the transport stream packet element of unit from smoothing buffer 702A when the transport packet data 701C assumes a half of a memory location of smoothing buffer 702A. Smoothing buffer 702A executes smoothing or stuffing in order to convert a variable time interval of the transport packet data 701C into a constant time interval.

Packetizer 703 separates each of smoothened transport packet data 702C, including the normal data, from smoothing buffer 702A, into two sync blocks and provides packetized data 703C by annexing a first additional information to the header of each of the sync blocks.

Packetizer 703 stores 96 bytes constituting smoothened transport packet data 702C from smoothing buffer 702A at addresses 6 to 101 of a higher rank of a local memory bank and inputs the rest of 96 bytes of smoothened transport packet data 702C into a lower rank of the local memory bank. Packetizer 703 stores, at addresses 0 to 5 of the higher rank of the local memory bank, a main header including a track number of a memory having each of the sync blocks separated from smoothened transport packet data 702C recorded thereon, a sync block number of the sync block, and recording system information for a present sync block data while storing the rest of 96 bytes of smoothened transport packet data 702C on the lower rank of the local memory bank.

Memory 704 sequentially records packetized data 703C in a relevant track thereof in accordance with a recording control signal in synchronization with a system clock on the basis of an address thereof which is computed by the value of an ID included in the first additional information of packetized data 703C from packetizer 703. Memory 704 is implemented by a dynamic RAM having a capacity of 4 [M-bit] and records packetized data 703C by a method for fast writing a page. Memory 704 has a capacity of 4 [M-byte] and records data having a capacity of 12 tracks including a higher rank of 6 tracks and a lower rank of 6 tracks.

Packetizer 703 annexes the first additional information to the header of each of the sync blocks and provides 99 bytes of packetized data 703C to memory 704. Packetizer 703 checks the time stamp of the packet header included in each of smoothened transport packet data 702C in order to determine whether data included in smoothened transport packet data 702C is a dummy data or a normal data and whether smoothened transport packet data 702C can be recorded in a present track of memory 704, and separates each of smoothened transport packet data 702C having the normal data in 96 bytes of unit in order to provide two sync blocks. When the sync blocks can be recorded in the present track of memory 704, packetizer 703 reads out smoothened transport packet data 702C from smoothing buffer 702A and internally generates an optional sync block when the sync blocks cannot be recorded in the present track of memory 704. Each of the sync blocks includes the ID which designates both a position of the track of memory 704 having the sync blocks recorded thereon and a position of a sync block belonging to the track, and the ID is not recorded on memory 704.

During the recording of data or when receiving a request for reading out data and for arbitrating data requirements colliding with each other, data controller 705 allocates time among devices to access memory 704. Data controller 705 receives subcode data from microcontroller 900 and records the subcode data at a relevant address of memory 704 which is provided by memory controller 706. Data controller 705 receives system data from microcontroller 900 and records the system data at a relevant address of memory 704 which is provided by memory controller 706, and generates a code in accordance with the order of the track in order to record the generated code at a parity section of each of the sync blocks of memory 704 after the coding is completed with respect to the main data recorded in 6 tracks of memory 704.

Memory controller 706 provides both a recording/readout address of a memory location and a recording/readout control signal in order to record or read out the data onto/from memory 704 under the control of data controller 705.

Shuffler 707 shuffles the sync blocks which are equivalent to packetized data 703C recorded in the tracks of memory 704, and generates error correcting code blocks. Shuffler 707 shuffles 1,836 sync blocks of 6 tracks which are recorded on memory 704, and configures 18 error correcting code blocks which respectively consist of 102 sync blocks. Each of the 102 sync blocks which are included in each of the 18 error correcting code blocks configures 112 columns. Shuffler 707 takes adjacent bytes from the different tracks by shuffling which is processed in a frame of unit, and executes a forward error correction when a burst error occurs at the tape.

RS coder 708 respectively executes an inner RS coding and an outer RS coding in a horizontal direction and in a vertical direction with respect to each of the error correcting code blocks from shuffler 707 and generates a parity. RS coder 708 sequentially executes a coding in the error correcting code block of unit, and one track consists of 3 error correcting codes. RS coder 708 firstly executes an outer error correcting coding and then executes an inner error correcting coding in order to produce a product code. RS coder 708 executes both the inner RS coding equivalent to an intra-sync block coding in the direction of a column and the outer RS coding equivalent to an inter-track RS coding in the direction of a row with respect to each of the error correcting code blocks from shuffler 707. RS coder 708 respectively generates an intra-sync block code and an inter-track code by the inner RS coding and by the outer RS coding, and executes sync block data forward error correction coding having a two-dimensional structure. The intra-sync block code is generated in order to restore an individual symbol error, and the inter-track code is generated in order to correct the burst error of the track. The intra-sync block code maximally corrects 4 symbol errors and the inter-track code maximally corrects 10 symbol errors by inputting erasure position information of the intra-sync block code incapable of error correction.

A track formatter 709A for configuring read sync blocks in the format of the track while reading out frame data recorded on memory 704 via data controller 705 in the order of the track and in the order of the sync block of each of the tracks 706 after the coding is completed by RS coder 708, and for providing track-formatted data 709C. Track formatter 709A accesses, via data controller 705, tracks having the assigned track numbers 0 to 5 in memory 704 and sync blocks having the assigned sync block numbers 0 to 335 of each of the tracks, and reads out the main sync block data and the subcode sync block data.

Track formatter 709A formats 336 sync blocks in one data of unit when data controller 705 is synchronized with a switching pulse for dividing a track which is configured in accordance with a period of 27 [MHz].

Memory controller 706 reads out a relevant data from memory 704 by a method for fast reading a page when a request for data is produced from track formatter 709A, and transmits the read data to track formatter 709A.

The higher rank of 6 tracks or the lower rank of 6 tracks of memory 704 constitutes a frame, and frame data which is processed in the first place is provided in order of the track to the tape via track formatter 709A while another frame data is provided from set-top box 17 after a coding of frame data inputted in the first place is completed by RS coder 708 in order to be recorded on the tape by means of a recording coding.

Scrambler 710A scrambles by M-sequence data both main code sync blocks and subcode sync blocks of track-formatted data 709C from track formatter 709A when establishing the relevant IDs as initial values thereof, and provides scrambled data 710C.

Track formatter 709A includes first and second local memory banks and the second local memory bank reads out the next sync block data from memory 704 by a method for fast reading a page with an acknowledgement of data controller 705 while data of the first local memory bank is provided to scrambler 710A in order to sequentially record the read next sync block data. Track formatter 709A inputs a track number of the sync block, a number assigned to the sync block, and a higher rank of a frame number or a lower rank of a frame number respectively provided by memory controller 706 in order to configure 2 bytes of ID information after recording the read next sync block data onto the second local memory bank, and generates 1 byte of a parity symbol relating to 2 bytes of the ID information through the inner RS coding in order to record the generated parity symbol at a relevant position. Track formatter 709A converts the data of the first local memory bank in the format of a train of bits as soon as data of the second local memory bank is completely provided to scrambler 710A, and provides converted data to scrambler 710A.

Precoder 711 precodes all data of the sync blocks except ambles and margins included in scrambled data 710C from scrambler 710A and provides precoded data 711C to the tape loaded in a deck 711C. Precoded data 711C from precoder 711 is recorded in the format of scrambled interleave-non return to zero inverted on the tape loaded in deck 800.

A switching pulse generator 720 generates a switching pulse in response to a pulse signal having the period of 27 [MHz] and provides the switching pulse to packetizer 703 and to data controller 705.

An ID generator 721 generates an ID signal in recording and provides the ID signal to track formatter 709A and scrambler 710A.

Figure 11:
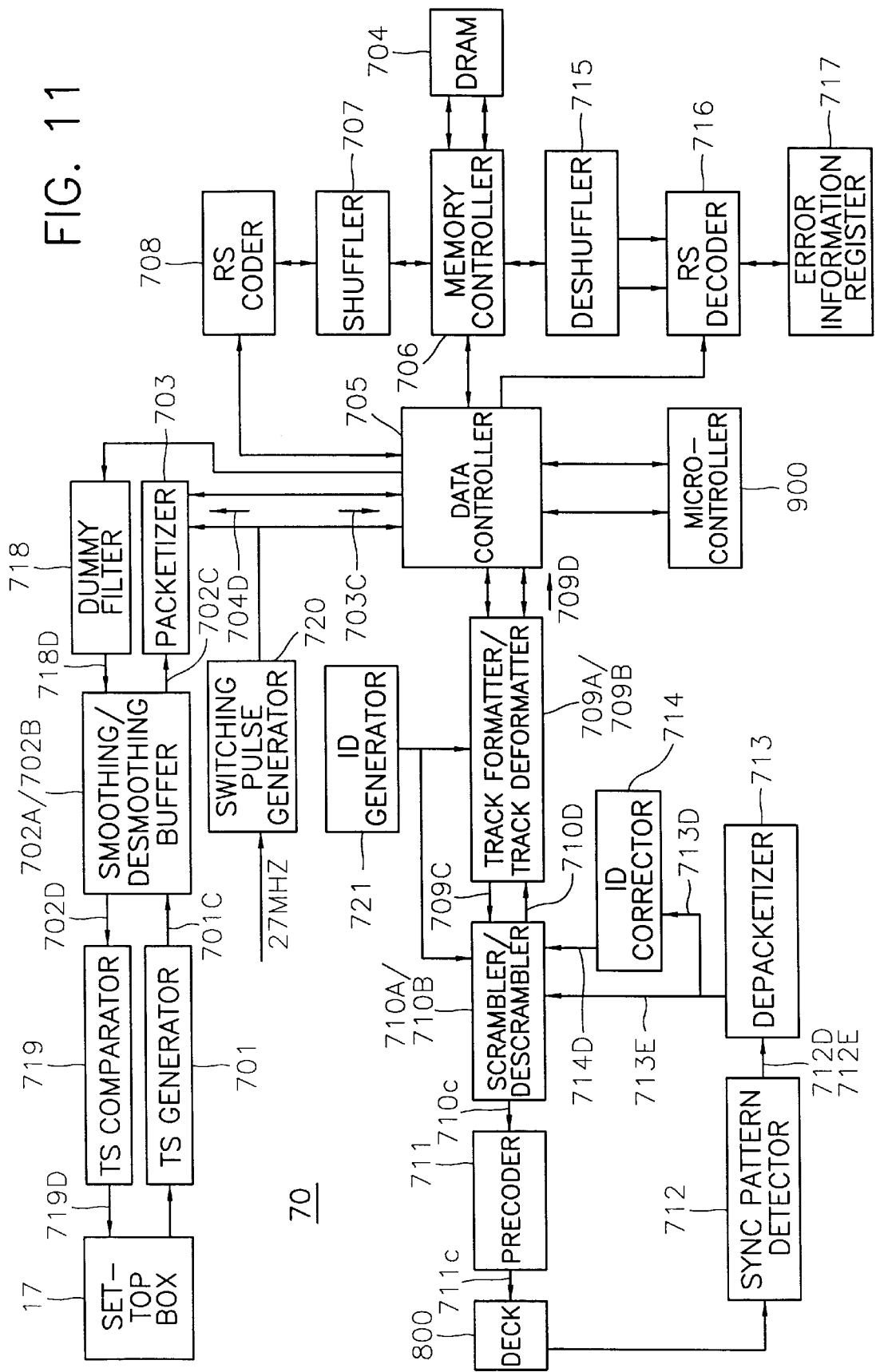
FIG. 11 is a block diagram for showing a circuit configuration of a codec of a D-VHS codec system according to an embodiment of the present invention.

FIG. 11 is a block diagram for showing a circuit configuration of a codec of a D-VHS codec system according to an embodiment of the present invention. As shown in FIG. 11, a codec 70 of a D-VHS codec system comprises a time stamp generator 701, a memory 704, a data controller 705, a memory controller 706, a shuffler 707, an RS coder 708, a precoder 711, a sync pattern detector 712, a depacketizer 713, an ID corrector 714, a scrambler/descrambler 710A/710B, a track formatter/track deformatter 709A/709B, a deshuffler 715, an RS decoder 716, an error information register 717, a packetizer 703, a dummy filter 718, a smoothing/desmoothing buffer 702A/702B, a time stamp comparator 719 and a microcontroller 900.

When the digital broadcast data is inputted in a train of bits in the form of the transport stream packet element via set-top box 17, time stamp generator 701 generates a time stamp representing an arrival time of a first byte of each of transport stream packet elements of digital broadcast data, and provides transport packet data 701C by annexing the relevant time stamp to a packet header of each of the transport stream packet elements.

In recording, memory 704 sequentially records a packetized data 703C in a relevant track thereof in accordance with a recording control signal in synchronization with a system clock on the basis of the address thereof which is computed by the value of an ID which is included in a first additional information of the packetized data 703C. In playback, memory 704 sequentially records a deformatted sync block data 709D in a relevant track thereof in accordance with a recording control signal in synchronization with a system clock on the basis of the address thereof which is computed by the value of an ID which is included in the deformatted sync block data 709D.

During the recording of data or when receiving a request for reading out data, data controller 705 allocates time among devices to access memory 704 and arbitrates data requirements which collide with each other. Data controller 705 receives subcode data from microcontroller 900 and records the subcode data at a relevant address of memory 704 which is provided by memory controller 706. Data controller 705 receives system data from microcontroller 900 and records the system data at a relevant address of memory 704 which is provided by memory controller 706, and generates a code in accordance with the order of the track in order to record the generated code at a parity section of each of the sync blocks of memory 704 after the coding is completed with respect to the main data recorded in 6 tracks of memory 704.

Memory controller 706 provides both a recording/readout address of a memory location and a recording/readout control signal in order to record or read out the data onto/from memory 704 under the control of data controller 705.

Shuffler 707 shuffles the sync blocks which are equivalent to the packetized data 703C recorded in the tracks of memory 704, and generates error correcting code blocks.

RS coder 708 respectively executes an inner RS coding and an outer RS coding in a horizontal direction and in a vertical direction with respect to each of the error correcting code blocks from shuffler 707, and generates a parity.

Precoder 711 precodes all data of the sync blocks except ambles and margins which are included in a scrambled data 710C, and provides precoded data 711C to the tape loaded in deck 800.

Sync pattern detector 712 divides a preamble, a subcode and a main code of each of the tracks of digital data having the format of a train of bits and being read from the tape loaded in deck 800, and detects sync data in the subcode and the main code in order to provide both sync-pattern-detected data 712D and information 712E which is related to a format thereof.

Depacketizer 713 divides to store sync-pattern-detected data 712D from sync pattern detector 712 in the sync block of unit based on information 712E related to the format of sync-pattern-detected data 712D from a sync pattern detector 712. Depacketizer 713 provides a read data 713E in the sync block of unit and classifies an ID included in a header of each of the sync blocks in order to provide a classified ID 713D.

ID corrector 714 judges whether or not classified ID 713D from depacketizer 713 is damaged, and provides a corrected ID 714D by executing an error correction of classified ID 713D when an error occurs.

In recording, scrambler/descrambler 710A/710B scrambles by M-sequence data both main code sync blocks and subcode sync blocks of track-formatted data 709C when establishing the relevant IDs as initial values thereof, and provides scrambled data 710C. In playback, scrambler/descrambler 710A/710B descrambles read data 713E in the sync block of unit from depacketizer 713 by using corrected ID 714D from ID corrector 714 as an initial value, and provides a descrambled data 710D.

In recording, track formatter/track deformatter 709A/709B configures read sync blocks in the format of the track while reading out frame data recorded on memory 704 via data controller 705 in the order of the track and in the order of the sync block of each of the tracks after the coding is completed by RS coder 708, and provides track-formatted data 709C. In playback, track formatter/track deformatter 709A/709B stores on a higher or a lower rank of local memory banks both main data sync blocks and subcode sync blocks which are respectively configured in the format of the track in descrambled data 710D from scrambler/descrambler 710A/710B, and provides a deformatted sync block data 709D.

When data controller 705 judges that the sync block data included in six tracks is completely recorded in a relevant track of memory 704, deshuffler 715 deshuffles the sync blocks for an error correcting coding from the tracks having the sync block data recorded therein and provides deshuffled sync blocks.

RS decoder 716 sequentially executes an inner decoding and an outer decoding in the sync block of unit with respect to the deshuffled sync blocks from deshuffler 715, and provides an error position information and an error magnitude information of each of the sync blocks.

Error information register 717 sequentially stores in assigned positions both the error position information and the error magnitude information of each of the sync blocks from RS decoder 716.

In recording, packetizer 703 separates each of smoothened transport packet data 702C, including the normal data, into two sync blocks, and provides packetized data 703C by annexing the first additional information to the header of each of the sync blocks. In playback, when data controller 705 judges after the error correction is completed that a playback stop signal is in an inactive state, packetizer 703 stores firstly-read sync block data 704D in the order of the track and the sync block while reading out error-corrected sync block data via data controller 705 by requesting data controller 705 to provide the error-corrected sync block data recorded on memory 704. Packetizer 703 outputs secondly-read sync block data 703D.

Dummy filter 718 excludes dummy sync block data from the secondly-read sync block data 703D from packetizer 703, and provides only normal sync block data 718D.

In recording, smoothing/desmoothing buffer 702A/702B sequentially stores transport packet data 701C from time stamp generator 701 while changing a variable time interval among a series of transport stream packet elements into a constant time interval with respect to transport packet data 701C, and provides smoothened transport packet data 702C. In playback, smoothing/desmoothing buffer 702A/702B stores normal sync block data 718D from dummy filter 718 in synchronization with the switching signal under the control of data controller 705.

While reading the time stamp of each of the sync block data with respect to the normal sync block data 702D which is read out from smoothing/desmoothing buffer 702A/702B, time stamp comparator 719 compares the time stamp with a present reference time stamp data and controls a point of a data transmission time to set-top box 17

A switching pulse generator 720 generates a switching pulse in response to a pulse signal having the period of 27 [MHz], and provides the switching pulse to latch 703 and to data controller 705.

An ID generator 721 generates an ID signal in recording and provides the ID signal to track formatter 709A and scrambler 710A.

Figure 12:
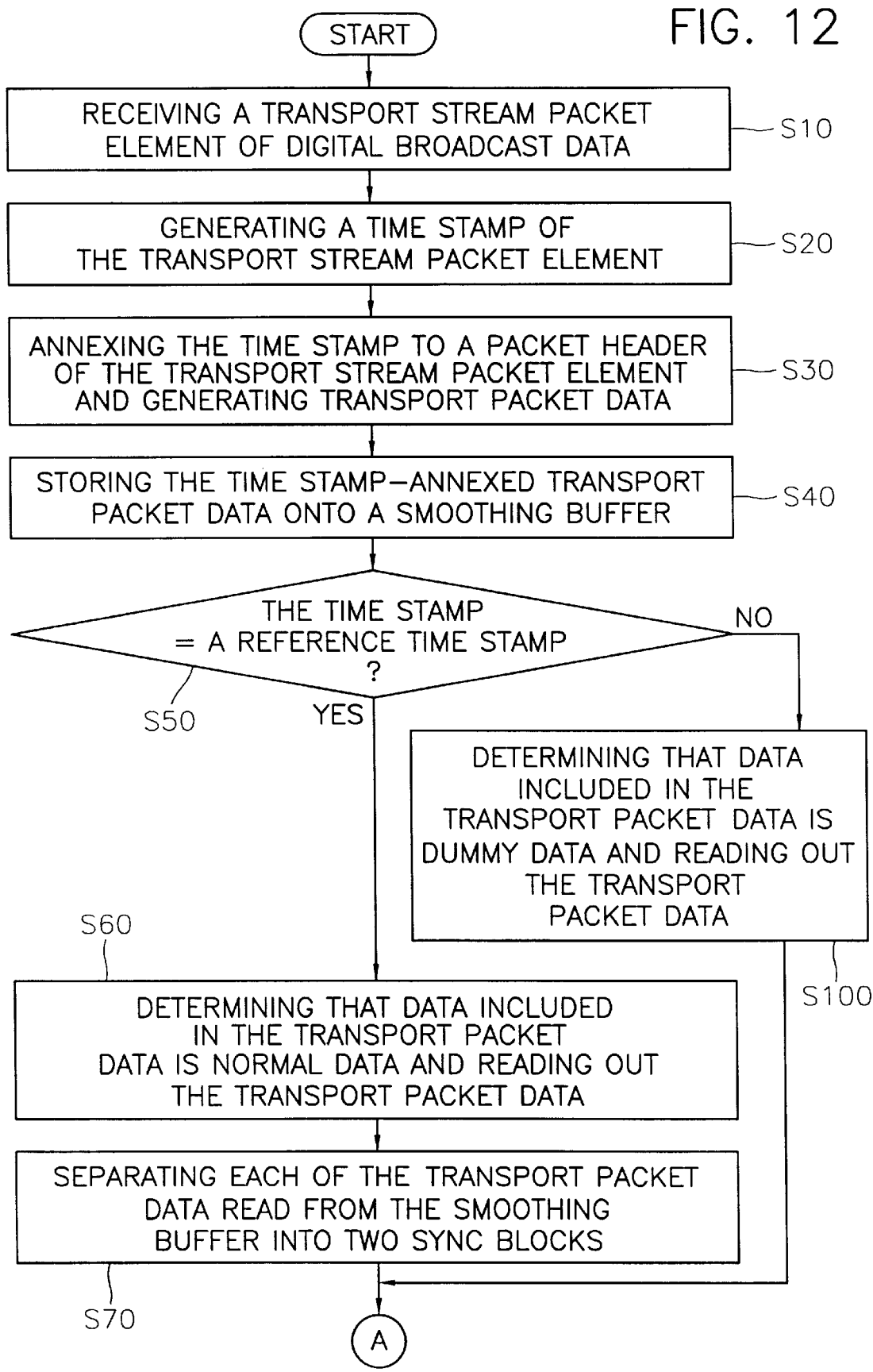
FIGS. 12 to 15 are a flow chart for illustrating a D-VHS coding method which is executed by the D-VHS coder shown in FIG. 10 or by the D-VHS codec shown in FIG. 11.
Figure 13:
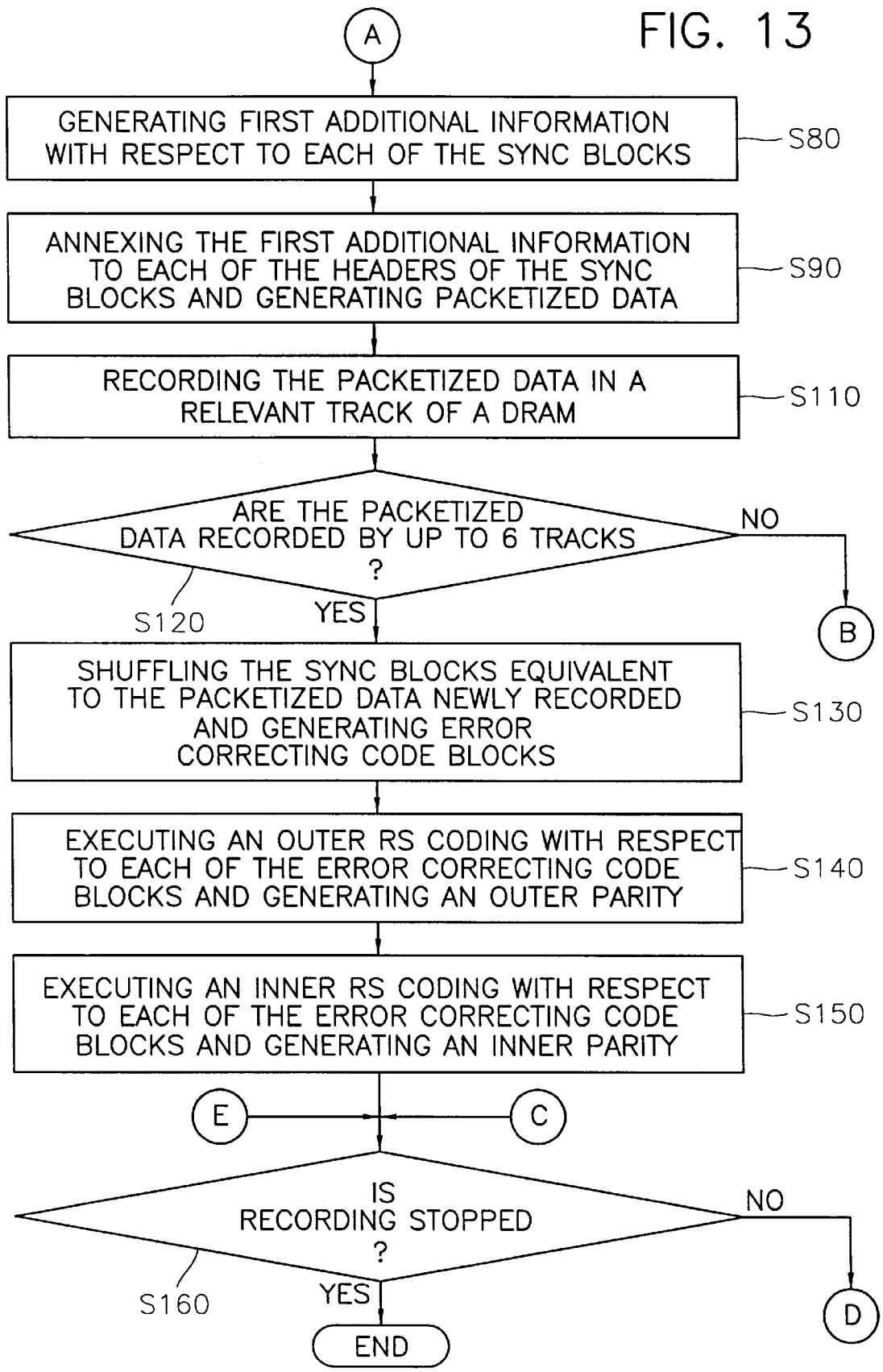
Figure 14:
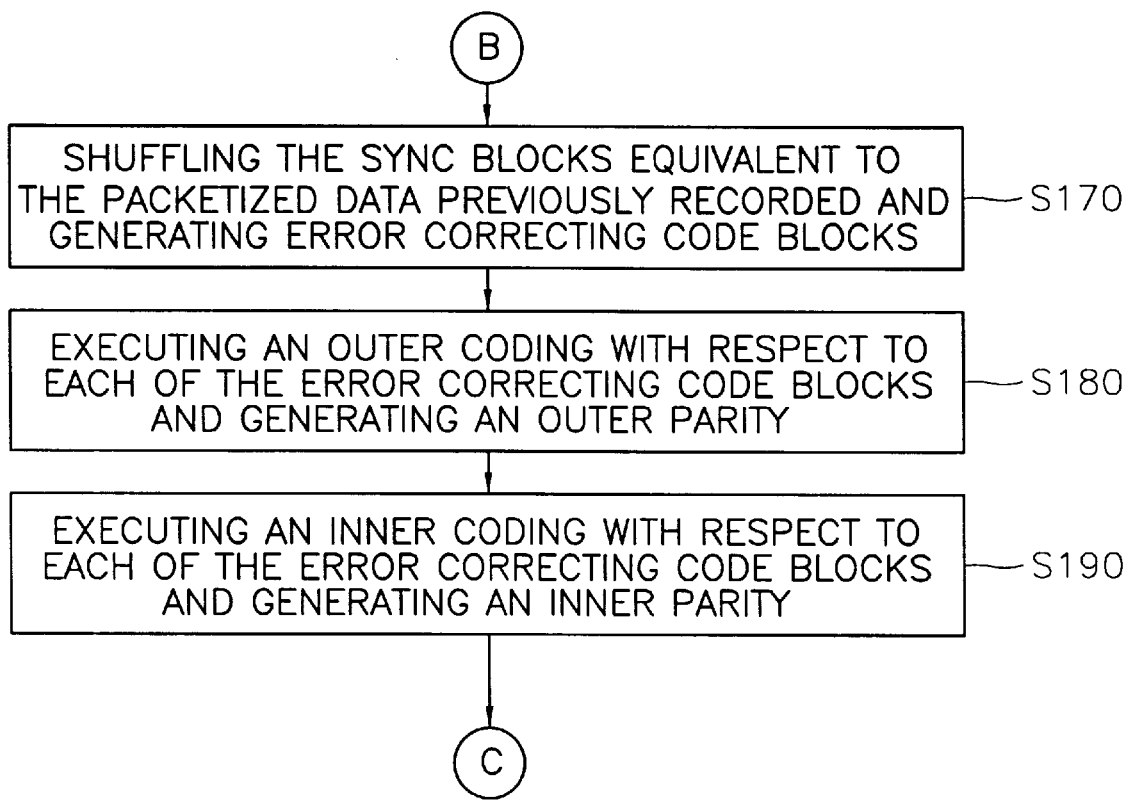
Figure 15:
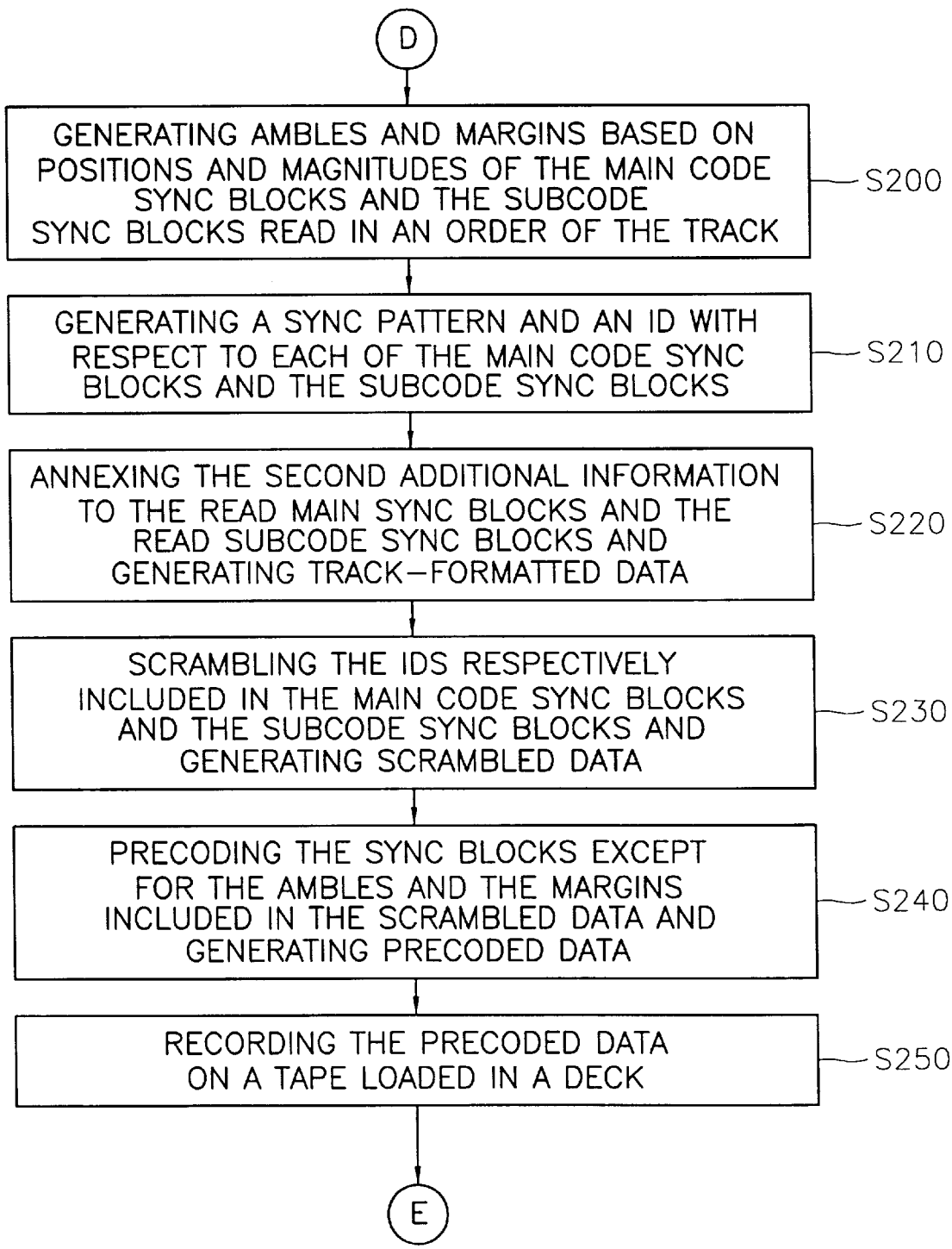

A description will next be made of the procedure of a D-VHS coding method which is executed by the D-VHS coder shown in FIG. 10 or the D-VHS codec shown in FIG. 11, in accordance with the flowchart of FIGS. 12 and 15.

FIGS. 12 to 15 are a flow chart for illustrating a D-VHS coding method which is executed by the D-VHS coder shown in FIG. 10 or by the D-VHS codec shown in FIG. 11.

Digital broadcast data which is propagated from a broadcasting station via a satellite is received in a train of bits in the form of a transport stream packet element via set-top box 17 (step S10). A time stamp which represents an arrival time of a first byte of each of the transport stream packet elements of the digital broadcast data which is received in step S10 is generated by time stamp generator 701 (step S20). The time stamp which is generated in step S20 is annexed to a packet header of each of the transport stream packet elements by time stamp generator 701, and transport packet data 701C having the time stamp annexed thereto is generated (step S30).

Transport packet data 701C which has the time stamp annexed thereto in step S30 is stored onto smoothing buffer 702A (step S40).

In steps S50 and S60, stuffings are inserting among transport packet data 701C on the basis of the time stamp of transport packet data 701C stored on smoothing buffer 702A in step S40 and the data is converted into data having a predetermined data rate. Data-rate-converted transport packet data 702C is read out from smoothing buffer 702A.

Whether or not the time stamp of the transport packet data 701C which is stored on smoothing buffer 702A in step S40 is the same as a reference time stamp is determined (step S50). When it is judged in step S50 that the time stamp is the same as the reference time stamp, it is determineed that data which is included in transport packet data 701C stored on the smoothing buffer 702A is normal data, and transport packet data 701C which has the normal data is read out from smoothing buffer 702A (step S60).

Each of transport packet data 702C which is read from smoothing buffer 702A and which includes the normal data is separated into two sync blocks by packetizer 703 (step S70). First additional information which includes an ID, a main header and a data-AUX of each of the sync blocks which is separated in step S70, is generated by packetizer 703 (step S80). The first additional information which is generated in step S80 is annexed to each of the headers of the sync blocks, and packetized data 703C is generated (step S90).

When it is judged in step S50 that the time stamp is not the same as the reference time stamp, it is determined that data which is included in transport packet data 701C stored on smoothing buffer 702A is dummy data, and transport packet data 701C which has the dummy data is read out from smoothing buffer 702A (step S100). Step S100 proceeds to step 80.

Packetized data 703C which is generated in step S80 is recorded in a relevant track of memory 704 in accordance with a recording control signal in synchronization with a system clock on the basis of the address of memory 704 which is computed by the value of an ID which is included in the first additional information generated in step S80 (S110).

Whether or not the packetized data 703C which is generated in step S90 is sequentially recorded in step S110 by up to a predetermined number of tracks on memory 704, is judged by data controller 705 (step S120).

When it is judged in step S120 that packetized data 703C is completely recorded in the relevant tracks, the sync blocks which are included in six tracks of packetized data 703C which is newly recorded in step S110 are shuffled by shuffler 707, and error correcting code blocks are generated (step S130). An outer RS coding is executed by RS coder 708 in a vertical direction with respect to each of the error correcting code blocks which are generated in step S130, and an outer parity is generated (step S140). An inner RS coding is executed by RS coder 708 in a horizontal direction with respect to each of the error correcting code blocks which are generated in step S130, and an inner parity is generated (step S150).

Data controller 705 judges whether or not a recording stop signal is in an enable state (step S160).

When it is judged in step S120 that packetized data 703C is not completely recorded in the relevant tracks, the sync blocks which are included in six tracks of packetized data 703C which is previously recorded on memory 704 are shuffled by shuffler 707, and error correcting code blocks are generated (step S170). An outer RS coding is executed by RS coder 708 in a vertical direction with respect to each of the error correcting code blocks which are generated in step S170, and an outer parity is generated (step S180). An inner RS coding is executed by RS coder 708 in a horizontal direction with respect to each of the error correcting code blocks which are generated in step S170, and an inner parity is generated (step S190). Step S190 proceeds to step S160.

When it is judged in step S160 that the recording stop signal is not in the enable state, ambles and margins for the main code sync blocks and the subcode sync blocks read from memory 704 in the order of the track and in the order of the sync block of each of the tracks, are generated by track formatter 709A based on both positions and magnitudes of the main code sync blocks and those of the subcode sync blocks (step S200). A sync pattern and an ID for each of the main code sync blocks and the subcode sync blocks are generated by track formatter 709A (step S210). A second additional information which includes the ambles and the margins generated in step S200 and which includes the sync pattern and the ID which are generated in step S210, are annexed to the main sync blocks and the subcode sync blocks which are read from memory 704, and track-formatted data 709C is generated (S220).

Both main code sync blocks and subcode sync blocks of the frame data which is configured in the format of the track in step S210, is scrambled by scrambler 710A in M-sequence when establishing the relevant IDs as initial values thereof, and scrambled data 710C is generated (step S230).

All data of the sync blocks except ambles and margins which are included in the scrambled data 710C which is generated in step S230 are precoded by precoder 711, and precoded data 711C is generated (step S240).

Precoded data 711C which is generated in step S240 is recorded on the tape which is loaded in deck 711C (S250).

Step S250 returns to step S160. When it is judged in step S160 that the recording stop signal is in the enable state, a recording operation stops.

In the coding method and the coder of a D-VHS codec system according to the present invention, an enormous quantity of computation which cannot be processed by programs, is performed in real time by an optimal data flow operation process method and the compressed or processed digital data is processed at a high speed. Also, a hardware configuration of the codec which conventionally includes two or three pieces of circuit board implements one custom-made semiconductor chip and cuts a unit cost of the manufacturing of the D-VHS codec.

While the present invention has been particularly shown and described with reference to particular embodiments thereof, it will be understood by those skilled in the art that various changes in form and details may be effected therein without departing from the spirit and scope of the invention as defined by the appended claims.

What is claimed is:

1. A coding method of a D-VHS codec system, said method comprising the steps of:

(i) annexing a time stamp to a packet header of each stream packet element when digital broadcast data propagated from a broadcasting station via a satellite is inputted in a form of transport stream packet elements via a set-top box, and generating transport packet data having the time stamp annexed thereto;

(ii) storing onto a smoothing buffer the transport packet data having the time stamp annexed thereto in step (i);

(iii) inserting stuffings among the transport packet data on the basis of the time stamp of the transport packet data stored on the smoothing buffer in step (ii) to convert into data having a predetermined data rate, and reading out data-rate-converted transport packet data;

(iv) separating each of the transport packet data being read from the smoothing buffer and including the normal data into two sync blocks, and generating packetized data by annexing a first additional information to the header of each of the sync blocks;

(v) recording the packetized data generated in step (iv) in a relevant track of a memory in accordance with a recording control signal in synchronization with a system clock on the basis of an address of said memory computed by the value of an ID included in the first additional information generated in step (iv);

(vi) judging whether or not the packetized data generated in step (iv) is sequentially recorded in step (v) up to a predetermined number of tracks;

(vii) shuffling the sync blocks with respect to the packetized data newly recorded in step (v) when it is judged in step (vi) that the packetized data is completely recorded in the relevant track, and executing both an inner RS coding and an outer RS coding in order to generate a parity;

(viii) judging whether or not a recording stop signal is in an enable state;

(ix) inputting, in an order of the track, frame data whose coding is completed in step (vii) when it is judged in step (viii) that the recording stop signal is not in the enable state, and configuring the frame data in a format of the track;

(x) scrambling in M-sequence both main code sync blocks and subcode sync blocks of the frame data configured in the format of the track in step (ix) when establishing the relevant IDs as initial values thereof, and generating scrambled data;

(xi) preceding all data of the sync blocks except ambles and margins included in the scrambled data generated in step (x) and generating preceded data;

(xii) recording preceded data generated in step (xi) on a tape loaded in a deck;

(xiii) returning to step (viii) after performing step (xii); and (xiv) stopping a recording operation when it is judged in step (viii) that the recording stop signal is in the enable state.

2. The coding method of a D-VHS codec system as claimed in claim 1, wherein said step (i) comprises the substeps of:

(A) receiving digital broadcast data propagated from a broadcasting station via a satellite in a train of bits in the form of a transport stream packet element via a set-top box;

(B) generating a time stamp representing an arrival time of a first byte of each of the transport stream packet elements of the digital broadcast data received in step (A); and (C) annexing the time stamp generated in step (B) to a packet header of each of the transport stream packet elements and generating transport packet data having the time stamp annexed thereto.

3. The coding method of a D-VHS codec system as claimed in claim 1, wherein said step (iii) comprises the substeps of:

(E) judging whether or not the time stamp of the transport packet data stored on the smoothing buffer in step (ii) is the same as a reference time stamp; and (F) determining that data included in the transport packet data stored on the smoothing buffer is normal data when it is judged in step (E) that the time stamp is the same as the reference time stamp, and reading out the transport packet data having the normal data.

4. The coding method of a D-VHS codec system as claimed in claim 1, wherein said step (iv) comprises the substeps of:

(G) separating each of the transport packet data being read from the smoothing buffer and including the normal data into two sync blocks;

(H) generating first additional information including an ID, a main header and a data-AUX for each of the sync blocks separated in step (G); and (I) annexing the first additional information generated in step (H) to each of the headers of the sync blocks and generating packetized data.

5. The coding method of a D-VHS codec system as claimed in claim 1, further comprising the substeps of:

(a) determining that data included in the transport packet data stored on the smoothing buffer is dummy data when it is judged in step (E) included in step (iii) that the time stamp is not the same as the reference time stamp, and reading out the transport packet data having the dummy data; and (b) proceeding to step (H) included in step (iv) after performing step (a).

6. The coding method of a D-VHS codec system as claimed in claim 1, wherein said step (vii) comprises the substeps of:

(L) shuffling the sync blocks included in the predetermined number of tracks of the packetized data newly recorded in step (v) when it is judged in step (vi) that the packetized data is completely recorded in the relevant tracks, and generating error correcting code blocks;

(M) executing an outer RS coding in a vertical direction with respect to each of the error correcting code blocks generated in step (L), and generating an outer parity; and (N) executing an inner RS coding in a horizontal direction with respect to each of the error correcting code blocks generated in step (L), and generating an inner parity.

7. The coding method of a D-VHS codec system as claimed in claim 1, wherein said step (ix) comprises the substeps of:

(O) generating ambles and margins with respect to the main code sync blocks and the subcode sync blocks read from said memory in order of the track and in order of the sync block of each of the tracks based on both positions and magnitudes of the main code sync blocks and those of the subcode sync blocks when it is judged in step (viii) that the recording stop signal is not in the enable state;

(P) generating a sync pattern and an ID with respect to each of the main code sync blocks and the subcode sync blocks; and (Q) annexing a second additional information including the ambles and the margins generated in step (0) and including the sync pattern and the ID generated in step (P) to the main sync blocks and the subcode sync blocks read from said memory, and generating track-formatted data.

8. The coding method of a D-VHS codec system as claimed in claim 1, further comprising the substeps of:

(a) shuffling the sync blocks included in a predetermined number of tracks with respect to the packetized data previously recorded on said memory when it is judged in step (vi) that the packetized data is not completely recorded in the relevant tracks, and generating error correcting code blocks;

(b) executing an outer RS coding in a vertical direction with respect to each of the error correcting code blocks generated in step (a), and generating an outer parity;

(c) executing an inner RS coding in a horizontal direction with respect to each of the error correcting code blocks generated in step (a), and generating an inner parity; and (d) proceeding to step (viii) after performing step (c).

9. A coder of a D-VHS codec system, said coder comprising:

a time stamp generator for generating a time stamp representing an arrival time of a first byte of each stream packet element of digital broadcast data when the digital broadcast data is inputted in a train of bits in a form of transport stream packet elements via a set-top box, and for providing transport packet data by annexing the relevant time stamp to a packet header of each of the transport stream packet elements;

a smoothing buffer for sequentially storing the transport packet data from said time stamp generator while changing a variable time interval among a series of transport stream packet elements into a constant time interval of the transport packet data, and for providing smoothened transport packet data;

a packetizer for separating each of the smoothened transport packet data, including the normal data, from said smoothing buffer, into two sync blocks, and for providing packetized data by annexing a first additional information to the header of each of the sync blocks;

a memory for sequentially recording the packetized data in a relevant track thereof in accordance with a recording control signal in synchronization with a system clock on the basis of an address thereof computed by the value of an ID included in the first additional information of the packetized data from said packetizer;

a data controller for allocating a time for each device to access said memory during the recording of data or when receiving a request for reading out data, and for arbitrating data requirements colliding with each other;

a memory controller for providing both a recording/readout address of a memory location and a recording/readout control signal in order to record or read out the data onto/from said memory under the control of said data controller;

a shuffler for shuffling the sync blocks equivalent to the packetized data recorded in the tracks of said memory, and for generating error correcting code blocks;

an RS coder for respectively executing an inner RS coding and an outer RS coding in a horizontal direction and in a vertical direction with respect to each of the error correcting code blocks from said shuffler, and for generating a parity;

a track formatter for configuring read sync blocks in the format of the track while reading out frame data recorded on said memory via said data controller in an order of the track and in an order of the sync block of each of the tracks after the coding is completed by said RS coder, and for providing track-formatted data;

a scrambler for scrambling by M-sequence data both main code sync blocks and subcode sync blocks of the track-formatted data from said track formatter when establishing the relevant IDs as initial values thereof, and for providing scrambled data;

a precoder for preceding all data of the sync blocks except ambles and margins included in the scrambled data from said scrambler, and for providing preceded data to a tape loaded in a deck; and a microcontroller for providing subcode data and system data to said data controller.

10. The coder of a D-VHS codec system as claimed in claim 9, wherein said packetizer checks the time stamp of the packet header included in each of the smoothened transport packet data in order to determine whether data included in the smoothened transport packet data is dummy data or normal data and whether the smoothened transport packet data can be recorded in a present track of said memory, and separates each of the smoothened transport packet data having the normal data in 96 bytes of unit in order to provide two sync blocks.

11. The coder of a D-VHS codec system as claimed in claim 10, wherein said packetizer reads out the smoothened transport packet data from said smoothing buffer when the sync blocks can be recorded in the present track of said memory, and internally generates an optional sync block when the sync blocks can not be recorded in the present track of said memory.

12. The coder of a D-VHS codec system as claimed in claim 9, wherein said a data controller receives subcode data from said microcontroller and records the subcode data at a relevant address of said memory provided by said memory controller.

13. The coder of a D-VHS codec system as claimed in claim 9, wherein said shuffler takes adjacent bytes from the different tracks by shuffling which is processed in a frame of unit, and executes a forward error correction when a burst error occurs at the tape.

14. The coder of a D-VHS codec system as claimed in claim 9, wherein said track formatter generates additional information including an amble, a margin, a sync pattern and an ID for the main code sync block and the subcode sync block on the basis of positions and magnitudes thereof, and respectively annexes the additional information to the main code sync blocks and the subcode sync blocks.

15. The coder of a D-VHS codec system as claimed in claim 9, wherein said higher rank of 6 tracks or said lower rank of 6 tracks of said memory constitutes a frame, and frame data processed in the first place is provided in the order of the track to the tape via said track formatter while another frame data is provided from said set-top box after a coding of frame data inputted in the first place is completed by said RS coder in order to be recorded on the tape by means of a recording coding.

16. The coder of a D-VHS codec system as claimed in claim 9, wherein said track formatter accesses, via said data controller, tracks having the assigned track numbers 0 to 5 in said memory and sync blocks having the assigned sync block numbers 0 to 335 of each of the tracks, and reads out the main sync block data and the subcode sync block data.

17. The coder of a D-VHS codec system as claimed in claim 9, wherein said track formatter includes first and second local memory banks and said second local memory bank reads out the next sync block data from said memory by a method for fast reading a page after an acknowledgement of said data controller while data of said first local memory bank is provided to said scrambler in order to sequentially record the read next sync block data.

18. The coder of a D-VHS codec system as claimed in claim 17, wherein said track formatter inputs a track number of the sync block, a number assigned to the sync block, and a higher rank of a frame number or a lower rank of a frame number respectively provided by said memory controller in order to configure 2 bytes of ID information after recording the read next sync block data on said second local memory bank, and generates 1 byte of a parity symbol relating to 2 bytes of the ID information through the inner RS coding in order to record the generated parity symbol at a relevant position.

19. The coder of a D-VHS codec system as claimed in claim 18, wherein said track formatter converts the data of said first local memory bank in the format of a train of bits as soon as data of said second local memory bank is completely provided to said scrambler, and provides converted data to said scrambler.

* * * * *